(12) United States Patent
Terraciano et al.

(10) Patent No.: US 8,817,831 B1
(45) Date of Patent: Aug. 26, 2014

(54) HIGH POWER UV LASERS

(71) Applicants: Matthew Terraciano, Smithtown, NY (US); Yusong Yin, Bohemia, NY (US); Andrea Burzo, Holbrook, NY (US)

(72) Inventors: Matthew Terraciano, Smithtown, NY (US); Yusong Yin, Bohemia, NY (US); Andrea Burzo, Holbrook, NY (US)

(73) Assignee: Photonics Industries Int'l., Bohemia, NY (US)

( * ) Notice: Subject to any disclaimer, the term of this patent is extended or adjusted under 35 U.S.C. 154(b) by 25 days.

(21) Appl. No.: 13/815,098

(22) Filed: Jan. 30, 2013

(51) Int. Cl.
*H01S 3/10* (2006.01)

(52) U.S. Cl.
USPC .................. 372/22; 372/21; 372/70; 372/97; 372/100

(58) Field of Classification Search
CPC ... H01S 3/0071; H01S 3/0078; H01S 3/0092; H01S 3/025; H01S 3/109
USPC ......................................... 372/22
See application file for complete search history.

(56) References Cited

U.S. PATENT DOCUMENTS

| | | |
|---|---|---|
| 5,943,351 A | 8/1999 | Zhou |
| 6,061,370 A | 5/2000 | Yin |
| 6,229,829 B1 | 5/2001 | Yin |
| 6,690,692 B2 | 2/2004 | Gao et al. |
| 6,999,483 B1 * | 2/2006 | Yin ................................. 372/22 |
| 7,130,321 B2 | 10/2006 | Spinelli et al. |
| 7,239,656 B2 | 7/2007 | Pang |
| 2007/0211773 A1 * | 9/2007 | Gerstenberger et al. ........ 372/22 |

* cited by examiner

*Primary Examiner* — Xinning Niu
(74) *Attorney, Agent, or Firm* — James A. Quinton

(57) ABSTRACT

A method and apparatus for spatially separating beams with different wavelengths is presented. The system includes: a light source (i.e. a laser with multiple harmonic output beams) with multiple wavelengths emitted along a single beam path or very nearly collinear beam paths, a path which connects the light source to a wavelength dependent beam separator, and a second path for blocking unwanted output wavelengths which connects the beam separation region to the laser output.

25 Claims, 6 Drawing Sheets

HIGH POWER UV LASERS

BACKGROUND OF THE INVENTION

For many industrial and scientific light sources, harmonic generation of the fundamental wavelength is required. This is typically achieved through the combined use of crystal materials such as LBO, BBO and CLBO, which efficiently convert infrared light beams with an optical frequency, $\omega$, into light beams with optical frequencies of $2\omega$, $3\omega$, $4\omega$ and higher harmonics. See U.S. Pat. No. 5,943,351 (Zhou); U.S. Pat. No. 6,061,370 (Yin).

Often, the end user desires the output to be free of light at frequencies other than the highest harmonic generated by the device. This requirement constrains the design by the necessary addition of dichroic mirrors or dispersive prisms for spatially separating the beams of unwanted wavelengths. In the former case, the optical coatings required can be complicated and costly. The coatings and mirror substrates are subject to damage, especially for high intensity or high pulse energy ultraviolet beams (UV). In the later case, optical coatings can be avoided, however the prisms can still exhibit bulk damage if the beam size is too small, and the propagation distance required to separate the wavelengths can be a significant constraint to the device design.

Other optical elements in the laser cavity can indirectly experience damage due to contamination by outgassing processes in the presence of UV radiation.

In many UV lasers, the output from the UV generating harmonic crystal is often directed upon wavelength separation optics in close proximity to the exit port, in an effort to minimize the number of components susceptible to damage. This can result in a beam size that is too small which can cause optical damage to these components.

Prior art addresses the minimization of the contamination of the optical components by purging of the entire cavity in a closed loop. U.S. Pat. No. 7,239,656. However, this approach requires an extended footprint of the laser to be purged, which can often be costly, as well as detrimental to the stability of the cavity by introducing unnecessary air flow currents. It is well known that mode-locked solid state oscillators are particularly sensitive to air currents.

Other approaches use a small separate enclosure to contain the harmonic crystals and the wavelength separation optical components. This, in turn, restricts these optical components to be near the harmonic crystals, where the small size of the beams increases the risk of damage to components.

SUMMARY OF THE INVENTION

According to the invention, a design for an all solid state UV laser is presented which has a reduced risk of bulk optical and coating damage of the optical components. The design minimizes the number of components in direct contact with the UV radiation by conveniently separating them in an enclosure, and also providing a long path (at least 25 cm or longer) for the beams to expand before the beams encounter the first component of the wavelength-dependent beam separator. The UV beam is then propagated further, allowing the final output to be relatively large, a convenience for many industrial applications. Furthermore, it achieves this without adding significant footprint area.

Housing the UV crystals in a separate sealed compartment serves a dual purpose. First the number of components enclosed with the UV crystals is limited, reducing outgassing in the presence of UV light. This serves to prevent surface deposition of contaminates on the optics and crystals enclosed in the UV chamber and to increase the overall stability and performance of the laser. The chamber is capable of being continuously purged and backfilled with dry nitrogen or clean air. This technique can lead to a significant increase in the lifetime of crystals and optics. Secondly any scattered UV light is blocked from entering the main cavity, reducing the outgassing effect in the main compartment.

The laser includes a cavity for generating an infrared beam, typically employing a solid state gain material. The IR resonator is located in a main compartment having a preselected length of at least 25 cm or longer. The main compartment has an exit port at one end to allow propagation of the output beam from the main compartment. An ultraviolet (UV) compartment, which is sealed from the main compartment, is in optical communication with the exit port and receives the beam propagating from the resonator cavity through the main compartment. A second harmonic generator is located within the main compartment or within the UV compartment in optical communication with the infrared beam and generates a second harmonic beam. The second harmonic beam and the infrared beam propagate on substantially the same beam path.

The UV compartment is located adjacent to and extends along the length of the main compartment. A non-linear crystal located at one end of UV compartment is used for converting the IR and second harmonic beams into a third harmonic UV beam of a preselected wavelength or the second harmonic beam into a fourth harmonic UV beam of a preselected wavelength. UV, infrared and second harmonic beams propagate from the UV crystal on a UV beam path which is adjacent to one side of the main compartment. The beams have beam waists at or prior to the UV generating crystal, such that the beams expand during propagation along the UV beam path.

A beam separator is provided along the UV beam path and is located adjacent to the outside of the main compartment at the end of UV compartment remote from the UV non-linear crystal. Desirably the beam separator is a set of prisms located along the UV beam path where the UV beam has been significantly expended in size from UV crystal. The UV beam is separated by the prisms from the infrared and the second harmonic beams. The prism set is used not only as a wavelength separator, but also for re-routing the final wavelength output beam on about 180° direction from the incident beams, conveniently extending the UV beam path and expanding the beam size without adding additional laser footprint area. A UV beam outlet in optical communication with the UV beam propagating from the prisms is located at the end of the UV compartment. The UV beam propagating from the UV beam outlet is substantially free of frequencies other than desired UV frequency. The UV beam propagating from the UV beam outlet has a beam diameter of 1 mm or greater. The resulting laser has a reduced risk of optical bulk or coating damage by allowing the beams to propagate through a long beam path to expand before the beams incident on the first component of the wavelength-dependent beam separator.

The laser according to the invention takes advantage of the geometry of the device to expand the UV beam before encountering the first optical element. The beams are then folded back along the same axis to separate and dump the unwanted output wavelengths. This is achieved while containing the UV crystals in a separate compartment, sealed from the main compartment and free of a large majority of optical components and mounts. This is particularly important for deep UV lasers, because even carefully selected low outgassing materials will experience accelerated outgassing rates in the presence of UV and deep UV light.

The preferred embodiment of the present invention is illustrated in the drawings and examples. However, it should be expressly understood that the present invention should not be limited solely to the illustrative embodiment.

DETAILED DESCRIPTION OF THE INVENTION

Figure 1:
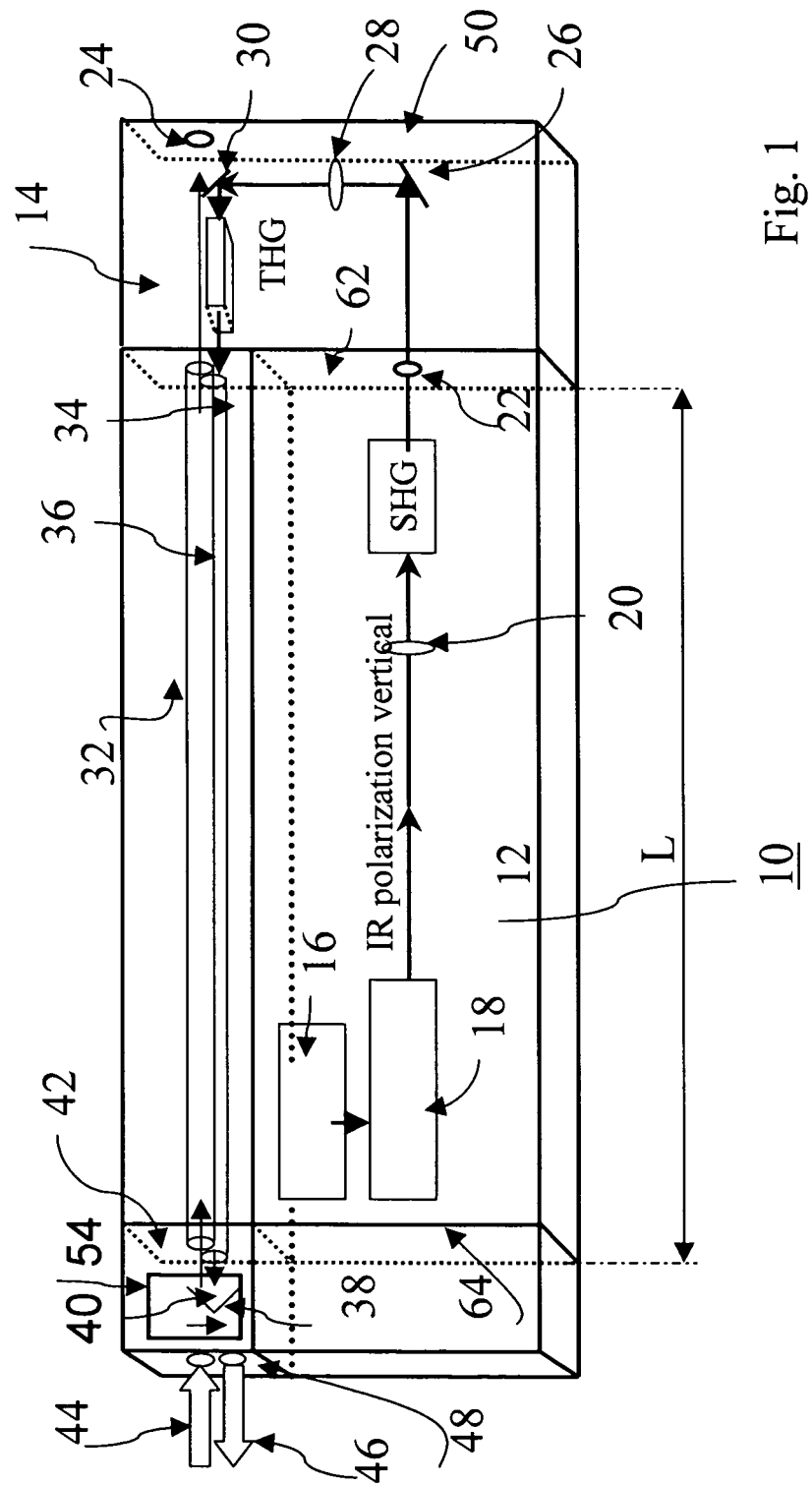
FIG. 1 is a schematic diagram of a laser looking from the top according to the invention.

According to the invention, a reliable UV laser that has a reduced risk of optical bulk or coating damage is provided. Particularly advantageous for high power UV lasers, the output beam diameter is desirably around 1 mm or even greater than 2 mm in diameter, while preserving the generation efficiency of the UV light and the compactness of the laser.

An infrared beam is generated inside a resonator cavity in a main compartment having a preselected length. One or more optional amplification stages can be provided in the main compartment to boost the power of the infrared beam produced in the laser resonator. The main compartment has an exit port at one end to allow propagation of output beam from the main compartment, into a sealed ultraviolet (UV) compartment. A second harmonic generator is located within the main compartment or within the UV compartment in optical communication with the infrared beam to generate a second harmonic beam. The second harmonic beam and the infrared beam propagate on substantially the same beam path upon exiting the second harmonic generator.

The UV compartment is located adjacent to and extends along the length of the main compartment preferably along the entire length of the main compartment which is at least 25 cm in length, preferably at least 30 cm, desirably 25 to 100 cm in length in an "L" shape. The UV compartment has a first end remote from the main compartment exit port and a second end proximate the final exit port of the laser. A non-linear crystal is placed inside the UV compartment and is temperature controlled. The phase matching condition necessary for generating the UV optical frequency can be satisfied by either temperature tuning or angle tuning.

A sealed UV compartment helps not only to minimize the possibility of damaging of optical components from the outgassing contaminants, but also improves the temperature stability of the UV crystal mount, which ultimately dictates the stability of the UV generation. To further improve the lifetime of the nonlinear crystal and of the optical components inside the UV compartment, purging of the entire UV compartment can be employed. Desirably the UV compartment is purged with either inert gasses such as nitrogen or clean dry air with various filters to remove outgases that develop from components illuminated by UV radiation.

Various nonlinear crystals can be employed to convert the infrared and second harmonic beams into a third harmonic UV beam of a preselected wavelength or second harmonic beam into a fourth harmonic UV beam of a preselected wavelength. Desirably, a third harmonic generating crystal, for example a LBO or BBO nonlinear crystal for third harmonic generation or a fourth harmonic generating crystal for example a CLBO or BBO crystal are used. UV, infrared and second harmonic beams propagate from a third harmonic crystal or UV and second harmonic beams from a fourth harmonic crystal along a UV beam path which is adjacent to one side of the main compartment and preferably extends substantially the entire length of the main compartment at least 25 cm in length. Many, if not most, laser systems are constructed with a rectangular footprint, where the laser output is extracted normal to one of the two shorter cavity walls. By exploiting this common design characteristic, the beams are allowed to propagate the maximum allowed distance (along the longer segment of the "L" shape) with at least 25 cm in length, preferably at least 30 cm, desirably 25 to 75 cm in length before entering the wavelength separation optics.

Typically, the infrared and second harmonic beams are focused into the third harmonic crystal for high conversion efficiency into the wavelength of interest. Depending on the cut of the crystal with respect to the material's optical axis, and of the angle cut of the exit face, the beam exiting the crystal can propagate either along the same path or emerge at a small angle with respect from each other. The emerging beams pass through an input bore located along the length of the main compartment where they become incident on a beam separator.

A beam separator is provided along the UV beam path located adjacent to the outside of the main compartment at the end of UV compartment remote from the UV non-linear crystal. Desirably the beam separator is preferably a set of prisms or optionally a dichroic mirror set located along the UV beam path where the UV beam has been significantly expended in size from UV crystal. In prior art the use of dichroic mirrors allows the separation of the wavelength of interest at the expense of damaging the optical coatings due to a small UV beam size. Thus, in prior art, the reliability and durability of optical instruments was limited by frequent damage of the optical components. This issue is addressed in the present invention by taking advantage of the long path that beams travels and expand before being incident on the beam separator such as a set of prisms or dichroic mirrors designed to separate the wavelength of interest.

Preferably the prism set is separated from the rest of the laser by a prism compartment which is open to purge air flow with the rest of the UV compartment. The two prisms are designed to minimize the losses at the wavelength of interest and the required polarization. The prism set could be for, example, a pair of Pellin Broca prisms preferably made of Calcium Fluoride ($CaF_2$). The prisms can be coated for the wavelength of interest if necessary. As mentioned above, the prism set serves a dual purpose: to separate the individual wavelengths, and to change the direction of propagation of the final output by essentially 180 degrees. After exiting the second prism, the final output beam enters a return bore, which is parallel with the input one. The relative locations of the two bores could be either one on top of the other, or side by side, depending on the polarization of the final output.

The final output travels then through the return bore and exits the laser through an exit port. The residual infrared and second harmonic beams are partially dumped from the prism set facets into the wall of the prism compartment and further down into the sides of the return bore. The prism compartment can be water-cooled for minimizing the heating effects of the residuals beams. Over time, power degradation can occur even on optical elements with large incident beam sizes. To further improve the reliability of the device, the prisms can be mounted on a translation stage in order to shift their positions, allowing the incident beams to impinge on to a new spot. By selecting prisms with a large size, the number of spots can be increased, ensuring that the initial output power is preserved.

Alternatively, a pair of dichroic mirrors can be used as the beam separator. The first mirror can be highly reflective to the UV beam and highly transmissive to either the infrared beam and/or the second harmonic beam, and the second mirror can be highly reflective to the UV beam and highly transmissive to the second harmonic beam and/or the infrared beam. Two mirrors are oriented such that the desired UV beam changes direction of propagation by essentially 180 degrees. After exiting the last mirror, the final output beam enters a return bore, which is parallel with the input one. The relative locations of the two bores can be either one on top of the other, or side by side, depending on the polarization of the final output. To further improve the longevity, the dichroic mirrors can be mounted in a stage where if the coating is damaged, the beams can be moved to a new fresh spot on mirrors without causing alignment changes. The infrared and the second harmonic beam exiting from mirror(s) will be dumped in the beam separator areas.

The laser according to the invention takes advantage of the form factor of the device to expand the beams before encountering the first optical element, a beam separator in this case. Preferably, the beams from the UV crystal propagate a distance equal to the main compartment which has at least 25 cm in length, preferably at least 30 cm, desirably 25 to 100 cm in length to or greater than the length of the main compartment. The beams are then folded back along the same axis to separate and dump the unwanted output wavelengths. This is achieved while containing the UV crystals and the beam separator optics in a separate compartment, sealed from the main compartment and free of a large majority of optical components and mounts. The accelerated damage rate of the optical components in the presence of UV and more so for deep UV light, can be addressed twofold. First the number of components enclosed with the UV crystals is limited, reducing outgassing in the presence of UV light and preventing surface deposition of contaminates on the optics and crystals enclosed in the UV chamber. To prevent damage to the few optical components located in the UV compartment, the chamber is capable of being continuously purged and backfilled with dry nitrogen or clean dry air. This technique can lead to a significant increase in the lifetime of crystals and optics. Secondly, any scattered UV light is blocked from entering the main cavity, reducing the outgassing effect in the main compartment.

Figure 3:
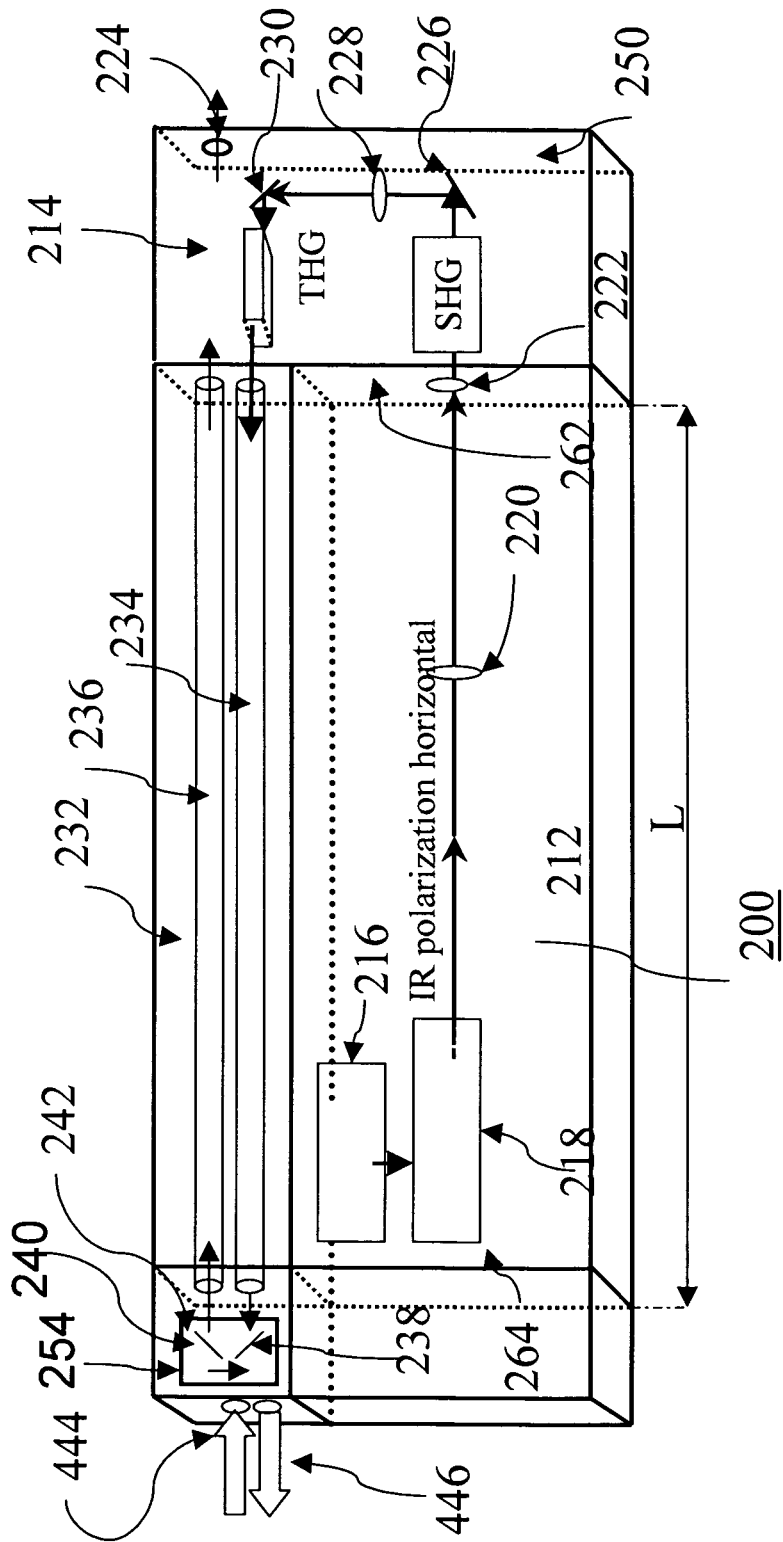
FIG. 3 is a schematic diagram of a laser looking from the top according to the invention.

Referring now to the drawings as shown in FIG. 1, a third harmonic laser 10 is provided. The laser includes a cavity for generating an infrared (IR) beam. Desirably a $Nd:YVO_4$ or Nd:YAG laser cavity 16 is provided. The IR cavity 16 is located in a main compartment 12, preferably a rectangular compartment having a preselected length L. One or more optional IR laser amplifiers 18 can be provided in the main compartment 12 to amplify the infrared beam produced in the IR cavity 16. The main compartment 12 has an exit port, desirably a window 22 transparent to IR and/or second harmonic radiation. This allows propagation of the output beam from the main compartment and prevents debris from the UV compartment from contaminating the main compartment. A second harmonic generator SHG, for example, a LBO nonlinear crystal, is provided in optical communication with the IR beam which has a vertical polarization. A focusing lens 20 is provided along the IR beam path prior to it passing through the second harmonic generator. The SHG generator can be located within the main compartment as shown in FIG. 1. Optionally the second harmonic beam can be produced in the UV compartment as shown in FIG. 3. The second harmonic beam and the infrared beam propagate on substantially the same beam path from second harmonic crystal SHG. Desirably, the main compartment is not gas purged.

An ultraviolet (UV) compartment that is sealed from the main compartment 12 is provided in optical communication with the exit port (transparent window) 22 of the main compartment and receives the beam propagating from the IR cavity 16 through the main compartment 12.

The UV compartment is preferably composed of three separate sections: a section for the UV generation 14, a section for propagation of the UV beam before and after wavelength separation 32, and a prism compartment 42. The UV generation section 14 is located adjacent to the exit port 22 of the main compartment along one of the short wall 62 of the rectangular main compartment 12. A UV beam outlet containing, desirably, a Brewster window 24 is provided at end 50 of the UV generation section 14. The UV propagation section 32 is located adjacent to and extends along the length of the main compartment 12 preferably along the entire length, L, of the main compartment 12. The length L is desirably at least 25 cm, preferably at least 30 cm, desirably 25 to 100 cm. The prism compartment 42 is located adjacent the opposite short wall 64 of the main compartment 12 separated from the UV generation section 14 by the UV propagation section 32.

As shown in FIG. 1, the UV generation section 14 includes a UV generator, desirably a third harmonic generator (THG). A mirror 26, which is highly reflective for IR and second harmonic beam, is provided in optical communication with beam propagating through main compartment exit port 22 to reflect the beams into the focusing lens 28. The focused beams are then directed to a mirror 30 that is highly reflective for infrared and second harmonic beam and subsequently reflected towards the third harmonic generator THG where a portion of the IR and second harmonic beams are converted to a third harmonic (UV) beam.

Desirably, the third harmonic generating crystal THG is an LBO, BBO or CLBO nonlinear crystal for third harmonic generation. UV, infrared and second harmonic beams propagate from the UV crystal on a UV beam path which is adjacent to one side of the main compartment 12 and preferably extends substantially along the entire length L of the main compartment through the bore 34 in the UV propagation section. The UV, infrared, and second harmonic beam waists are located at or prior to the UV generating crystal, such that the UV, infrared, and second harmonic beams expand during propagation along the UV crystal beam path through bore 34.

The beams propagating from the UV crystal expand along the UV beam path along the length of UV propagation section 32. According to the invention, the UV beam propagating from the UV beam outlet 24 has a beam diameter greater than 1.0 mm, preferably 1.0 mm to 2.0 mm. The preselected length L of the main compartment 12 is sufficient that the UV beam at the UV beam outlet 24 has a diameter of 1.0 mm or greater.

The UV propagation section 32 is desirably a solid metal rectangular block, preferably an aluminum block having two vertically spaced tubular bores 34 and 36. The bores have a diameter which is larger than the desired UV beam diameter propagating from Brewster window outlet 24 preferably 5 to 8 time larger, desirably at least 2 to 5 times the desired UV beam diameter. Optionally, a hollow compartment can be used or a hollow compartment with two metal tubes extending the length of the compartment.

The prism compartment 42 is located adjacent to the end 64 of the main compartment opposite the UV compartment. The prism compartment 42 preferably includes a prism or mirror set, preferably a pair of Pellin Broca prisms 38 and 40, in optical communication with bores 34 and 36 of the UV propagation section 32. A purging gas inlet 44 and outlet 46 are incorporated into the prism compartment 40 for improving the lifetime of the optical surfaces. The prism or mirror set can be mounted on a translation stage 54, such that the position of the incident beam is changed to a new spot if bulk or surface damage occurs.

Figure 5:
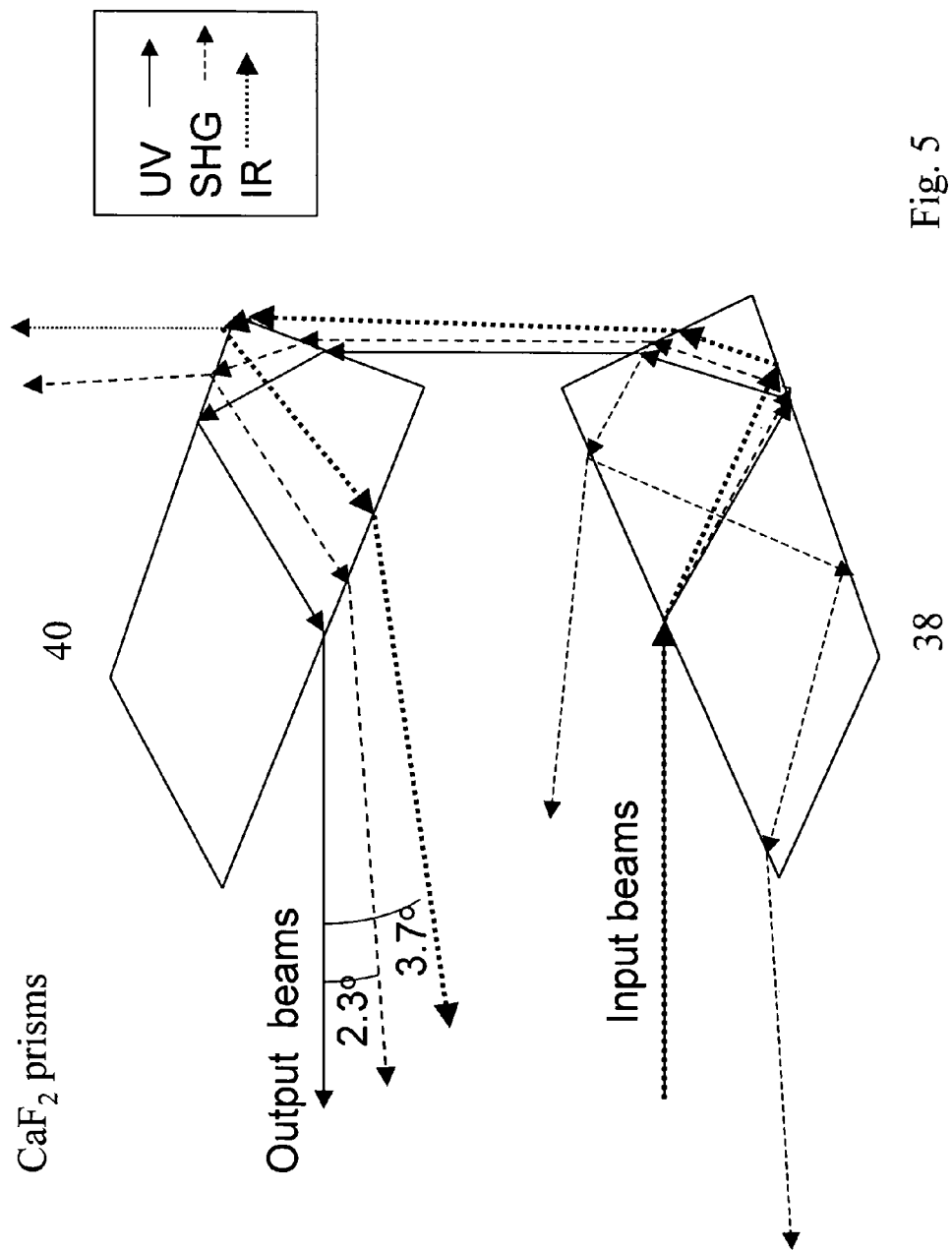
FIG. 5 is a schematic diagram of the beams of the laser of FIG. 1 passing through the prisms.

As best seen in FIG. 5, a pair of prisms 38 and 40 is located in the prism compartment, along the UV beam path to spatially separate the UV, infrared, and second harmonic beams. Pellin Broca prisms are a convenient choice for dispersing and redirecting the output beam in the current geometry. Different types of materials can be utilized for the set of the prisms depending on the desired output wavelength. One choice would be Calcium Fluoride ($CaF_2$), which is used for windows, prisms and lenses, transmitting from the vacuum ultraviolet into the infrared. Calcium fluoride is commonly used for deep UV laser optics because it shows a very low tendency of color center formation as compared to other UV optical materials. It is a physically and chemically stable optical material with good water and chemical resistance. A special UV grade makes it an excellent choice for fabrication of the UV laser components. The surface of the prisms can be coated for low reflection losses or left uncoated for increased reliability.

The prism pair directs the UV beam on a separate path from the infrared and second harmonic beams. As can be seen in FIG. 5 the UV beam is refracted by prism 38 along with some of the IR and second harmonic beam with different angles which separates the beams. The beams are directed to prism 40 where the beams are further refracted. Prism 38 is oriented so that the UV beam is refracted by about 90 degrees°. The UV and some second harmonic and IR radiation are further refracted by prism 40 with the UV beam turned an additional about 90 degrees. Thus, the UV beam from prism 40 counter propagates in the direction opposite the beams propagating through bore 34. The UV beam is the directed through bore 36 to travel in the opposite direction to the beam propagating through crystal THG. The infrared and second harmonic beams are dispersed by the prisms and a main portion is directed into the walls of the prism enclosure. The remainder of the IR and second harmonic beams are off axis and impact harmlessly into the walls of the UV propagation section 32.

The UV beam path extends along the outside of the main compartment and desirably along its entire length, L. A UV beam outlet 24 in optical communication with the UV beam propagating from the UV propagation section bore 36 is located at the end of the UV generation compartment 14 and preferably aligns with bore 36. The resulting UV beam propagating from the UV beam outlet is essentially free of frequencies other than desired wavelength, here the third harmonic. The UV output beam has a beam diameter greater than 1.0 mm, preferably 1.0 mm to about 2.0 mm in diameter. The length of the main compartment is chosen to allow sufficient beam expansion of the UV beam to the desired beam diameter on its two passes along the length of the main compartment through the bores 34 and 36 of the travel compartment 32.

Figure 6:
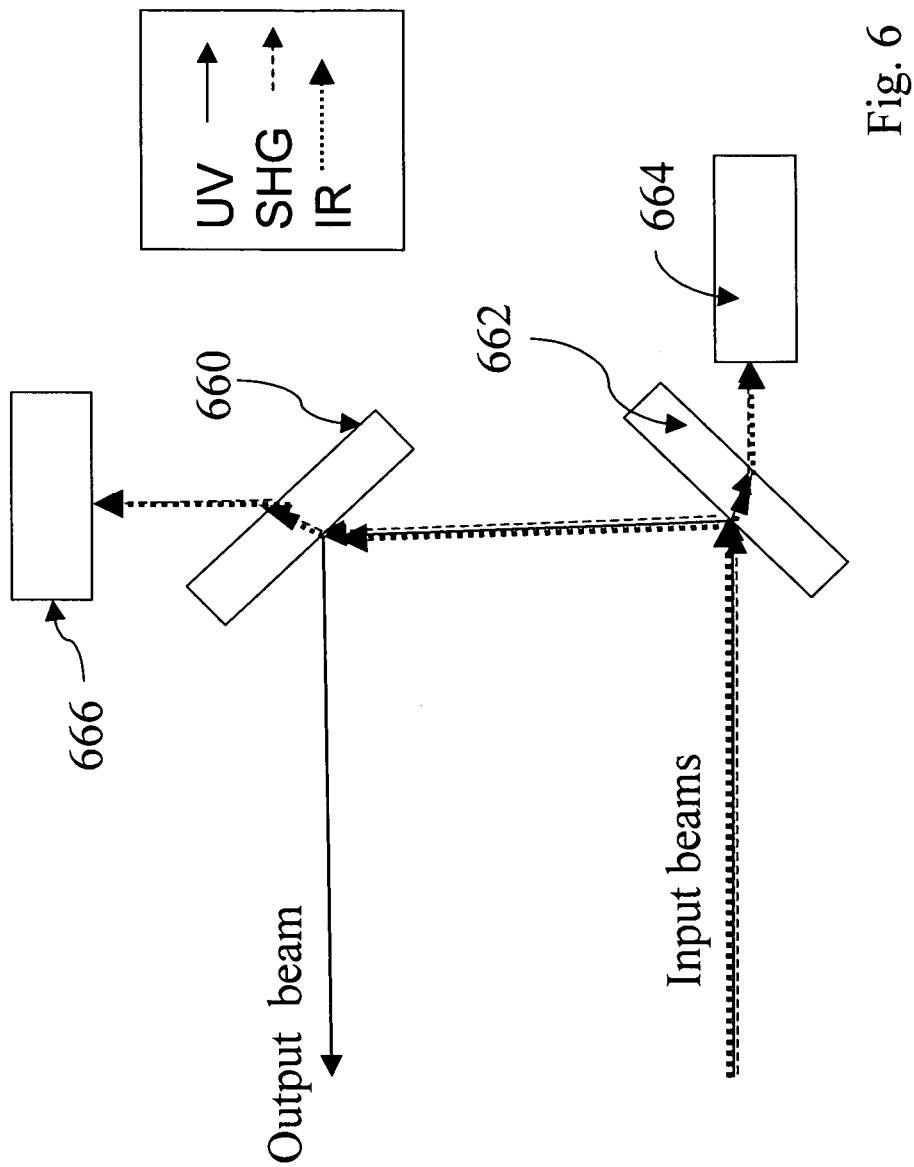
FIG. 6 is a schematic diagram of the beams of the laser of FIG. 1 passing through the dichroic mirrors.

Alternatively, as best seen in FIG. 6, the prism set 38 and 40 can be replaced by a set of dichroic mirrors 66o and 662. The mirrors are reflecting the wavelength of interest, while the unwanted frequencies are transmitted through the first mirror 662 and sent into a beam dump 664. The second dichroic mirror 660 is positioned in such a way to reflect the desired output wavelength on a 180° path through a second bore 36 and finally extracted from the laser through a Brewster output window 24. A small reflection of the undesired wavelengths from mirror 662 is transmitted through the second dichroic mirror 66o and enters a beam dump 666. The large size of the beam on the set of mirrors allows for an increased lifetime of the system compared to prior art. To further improve the reliability and minimize the down time of replacing the beam separator components, the set of mirrors can be placed on a translation stage for easy automatic indexing of the incident beam spots.

Figure 2:
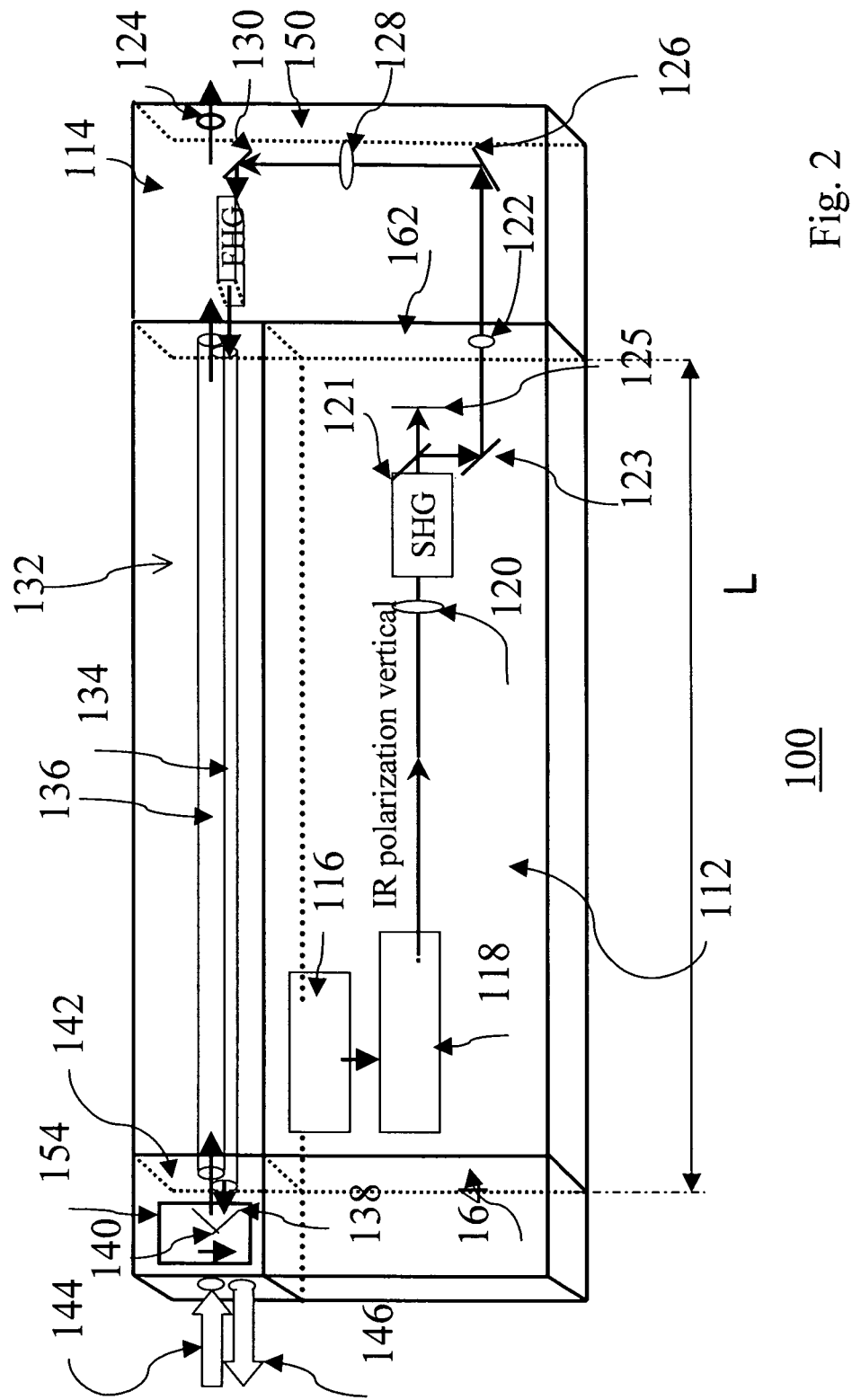
FIG. 2 is a schematic diagram of a laser looking from the top according to the invention.

As best seen in FIG. 2, a fourth harmonic laser according to the invention is provided. The laser has an IR resonator cavity for generating an infrared beam. Desirably a $Nd:YVO_4$ or Nd:YAG laser cavity 116 is provided. One or more optional IR laser amplifiers 118 can be provided in the main compartment 112 to amplify the infrared beam produced in the IR cavity 116. The laser cavity 116 is located in a main compartment 112 having a preselected length, L. A second harmonic generator SHG, for example a KTP or LBO or BBO nonlinear crystal, is provided in optical communication with the IR beam. The main compartment 112 has an exit port desirably a transparent window 122 for IR and/or second harmonic beam to allow propagation of output beam from the main compartment and prevent contamination of the main compartment by the UV light. A focusing lens 120 is provided along the IR beam path prior to it passing through the second harmonic generator. The second harmonic generator is provided, desirably within the main compartment. Optionally, the resonator cavity can include the SHG crystal to produce second harmonic beam within the cavity. Optionally the second harmonic beam can be produced in the UV compartment.

An ultraviolet (UV) compartment that is sealed from the main compartment 112 is provided in optical communication with the exit port 122 of the main compartment and receives the beam(s) propagating from the IR cavity 116 through the main compartment 112. A second harmonic crystal (SHG) desirably is located within the main compartment 112. The second harmonic beam and the infrared beam propagate on substantially the same beam path from second harmonic crystal SHG. A mirror 121 which is highly reflective of the second harmonic beam and highly transparent to the fundamental beam is provided in optical communication with beams passing through the second harmonic generator SHG. Mirror 123 which is highly reflective for second harmonic beam is provided in optical communication with second harmonic beam from mirror 121 and directs the second harmonic beam to main compartment exit port 122. An optional beam dump 125 is provided to receive and absorb infrared beam transmitted by mirror 121.

The UV compartment is preferably composed of three separate sections. These sections are a UV generation section 114, a UV propagation section 132, and a prism compartment 142. The UV propagation section 132 is located adjacent to and extends along the length of the main compartment 112 preferably along the entire length L of the main compartment 112. A UV beam outlet, desirably Brewster window 124, is provided at the end 150 of the UV generation compartment 112.

As shown in FIG. 2, the UV generation compartment 114 includes a fourth harmonic UV generator, desirably a fourth harmonic nonlinear crystal FHG. The UV generator is located in the UV generation section 114 in optical communication with the main compartment exit port 122 for converting the second harmonic beam into a fourth harmonic UV beam of a preselected wavelength. Desirably, the fourth harmonic generating crystal FHG is a CLBO, or a BBO nonlinear crystal for fourth harmonic generation.

A mirror 126 which is highly reflective for second harmonic beam is provided in optical communication with beam propagating through main compartment exit port 122 to reflect the beam through focusing lens 128. The focused beam is then directed to mirror 130 that is highly reflective for second harmonic beam. The beam is then reflected into a fourth harmonic generator FHG where a portion a second harmonic beam is converted to fourth harmonic beam.

UV and second harmonic beams propagate from the UV crystal FHG on a UV beam path through bore 134 which is adjacent to one side of the main compartment 112 and preferably extends substantially the entire length L of the main compartment. The UV and second harmonic beams have a beam waist at or prior to the UV generating crystal FHG, such that the UV and second harmonic beams expand during propagation along the UV beam path through bore 134. The bores 134 and 136 have a diameter which is larger than the desired UV beam diameter propagating from Brewster window outlet 124, preferably 6 to 8 time larger desirably at least 2 to 6 times the desired UV beam diameter.

The UV propagation section 132 is desirably a solid metal rectangular block, preferably aluminum. The compartment 132 desirably includes two horizontally spaced tubular bores 134 and 136 for receipt of UV beam. Optionally a hollow compartment can be used or a hollow compartment with two metal, preferably aluminum tubes extending the length of the compartment.

The prism compartment 142 is located adjacent to the end of the main compartment 112 remote from the main compartment exit port 122. The prism compartment 142 includes a mirror or prism set, preferably a pair of Pellin Broca prisms 138 and 140 in optical communication with bores 134 and 136 of the UV propagation section 132. Prism compartment 140 desirably has purging inlet 144 and purging outlet 146 so that the entire UV compartment can be purged. A translation stage 154 is provided for mounting the set of prisms or optional dichroic mirrors to change the position of the incident beams on the prisms or mirrors in case damage occurs on the prisms or to the mirror coating to increase the lifetime of the wavelength separator.

The beams propagating from the UV crystal expand along the UV crystal beam path that is the length of UV propagation section 132. According to the invention, beam propagating from said UV beam outlet 124 has a beam diameter greater than 1.0 mm preferably 1.0 mm to 2.0 mm. The preselected length, L, of said main compartment is sufficient that said UV beam has a diameter to UV beam outlet 124 of 1.0 mm or greater. The length L of the main compartment is chosen to allow sufficient beam expansion of the UV beam to the desired beam diameter on its two passes along the length of the main compartment in the bore 134 and 136 of the propagation section. L is at least 25 cm in length, preferably at least 30 cm desirably 25 to 100 cm in length.

The UV beam path extends through the UV propagation section along the outside of the main compartment and desirably along it length, L. A UV beam outlet 124 in optical communication with the UV beam propagating from the UV propagation section bore 136 is located at the end of the UV generation compartment 114 and preferably aligns with bore 136. The resulting UV beam propagating from the UV beam outlet is substantially free of frequencies other than desired UV wavelength, here the fourth harmonic. The UV compartment is sealed from the main compartment. Desirably the UV compartment is purged with nitrogen or clean dry air through purge inlet 144 and purge outlet 146 to remove outgases that develop from contact of components with UV.

The resulting laser has a reduced risk of optical bulk or coating damage by allowing the beams to propagate through a long beam path before it incidents on the first component of the wavelength dependent beam separator. The UV beam propagating from the UV beam outlet desirably has a large beam size of 1.0 mm or greater, preferably 1.0 mm to 2.0 mm, which is often desired by the industrial end user.

As best seen in FIG. 3, a third harmonic laser 10 is provided. The laser includes a laser cavity for generating an infrared beam with a horizontal polarization. It is similar to FIG. 1 except the second harmonic generation occurs in the UV generation compartment 214. Desirably a Nd:YVO$_4$ or Nd:YAG laser cavity preferably Nd:YVO$_4$ IR resonator 216 is provided. The IR resonator 216 is located in a main compartment 212 having a preselected length L as described above. The main compartment 212 has an exit port, desirably a transparent window 222 transparent to the IR beam, to allow propagation of output beam from the main compartment and prevent debris from the UV compartment from contaminating the main compartment. One or more optional IR laser amplifiers 218 can be provided in the main compartment 212 to amplify the infrared beam produced in the IR cavity 216. A focusing lens 220 is provided along the IR beam path prior to it passing through the transparent window 222.

An ultraviolet (UV) compartment sealed from the main compartment 212 is provided in optical communication with the exit port 222 of the main compartment and receives beam propagating from the IR cavity 216 through the main compartment 212. The UV compartment is preferably composed of three separate sections. These sections are a UV generation section 214, a UV propagation section 232, and a prism compartment 242. The UV propagation section 232 is located adjacent to and extends along the length of the main compartment 212 preferably along the entire length L of the main compartment 212. A UV beam outlet, desirably a Brewster window 224, is provided at the end 250 of the UV generation compartment 214. A second harmonic generator SHG, for example a LBO nonlinear crystal, is provided in optical communication with the IR beam passing through transparent window 222. A portion of the IR beam passing through SHG is converted to second harmonic beam.

The UV generation section 214 includes a UV generator desirably a third harmonic generator THG. A mirror 226 which is highly reflective for IR and second harmonic beam is provided in optical communication with the beams propagating from the second harmonic generator SHG to reflect the beam through focusing lens 228. The focused beams are then directed to mirror 230 that is highly reflective for infrared and second harmonic beams. The beams are then reflected through third harmonic generator THG where a portion of the IR and second harmonic beams are converted to third harmonic beam. A UV generator, preferably a UV generating crystal THG, is located in the UV generation section 214 in optical communication with the main compartment exit port 222 for converting infrared and second harmonic beams into a third harmonic UV beam of a preselected wavelength. Desirably, the third harmonic generating crystal THG is a LBO, BBO or CLBO nonlinear crystal for third harmonic generation. UV, infrared and second harmonic beams propagate from the UV crystal on a UV beam path that is adjacent to one side of the main compartment 212 and preferably extends substantially the entire length L of the main compartment through the bore 234 in the propagation section.

The UV, infrared, and second harmonic beams have a beam waist at or prior to the UV generating crystal, such that the UV, infrared, and second harmonic beams expand during propagation along the UV crystal beam path through bore 234. The length of the main compartment is chosen to allow sufficient beam expansion of the UV beam to the desired beam diameter on its two passes along the length of the main compartment in the bore 234 and 236 of the propagation section.

The UV propagation section 232 is desirably a solid metal rectangular block, preferably aluminum, having two vertically spaced tubular bores 234 and 236. The bores have a diameter which is larger than the desired UV beam diameter propagating from Brewster window outlet 24, preferably 5 to 8 time larger desirably at least 2 to 5 times the desired UV beam diameter. Optionally a hollow propagation section can be used or a hollow compartment with two metal tubes, preferably aluminum tubes, extending the length of the compartment. The beams propagating from the UV crystal expand along the UV beam path that is the length of UV propagation section 232. According to the invention, the beam propagating from said UV beam outlet 224 has a beam diameter greater than 1.0 mm preferably 1.0 mm to 2.0 mm. The preselected length L of said main compartment 212 is sufficient that the UV beam at the UV beam outlet 224 has a diameter of 1.0 mm or greater after they travel through bores 236 and 234.

The prism compartment 242 includes a prism or mirror set preferably a pair of Pellin Broca prisms 238 and 240 in optical communication with bores 234 and 236 of the UV propagation section 232. Prism compartment 240 desirably has purging inlet 244 and purging outlet 246 so that the entire UV compartment can be purged. The prism set can be mounted on a translation stage 254 for changing the position of the incident beam in case damage occurs.

Figure 4:
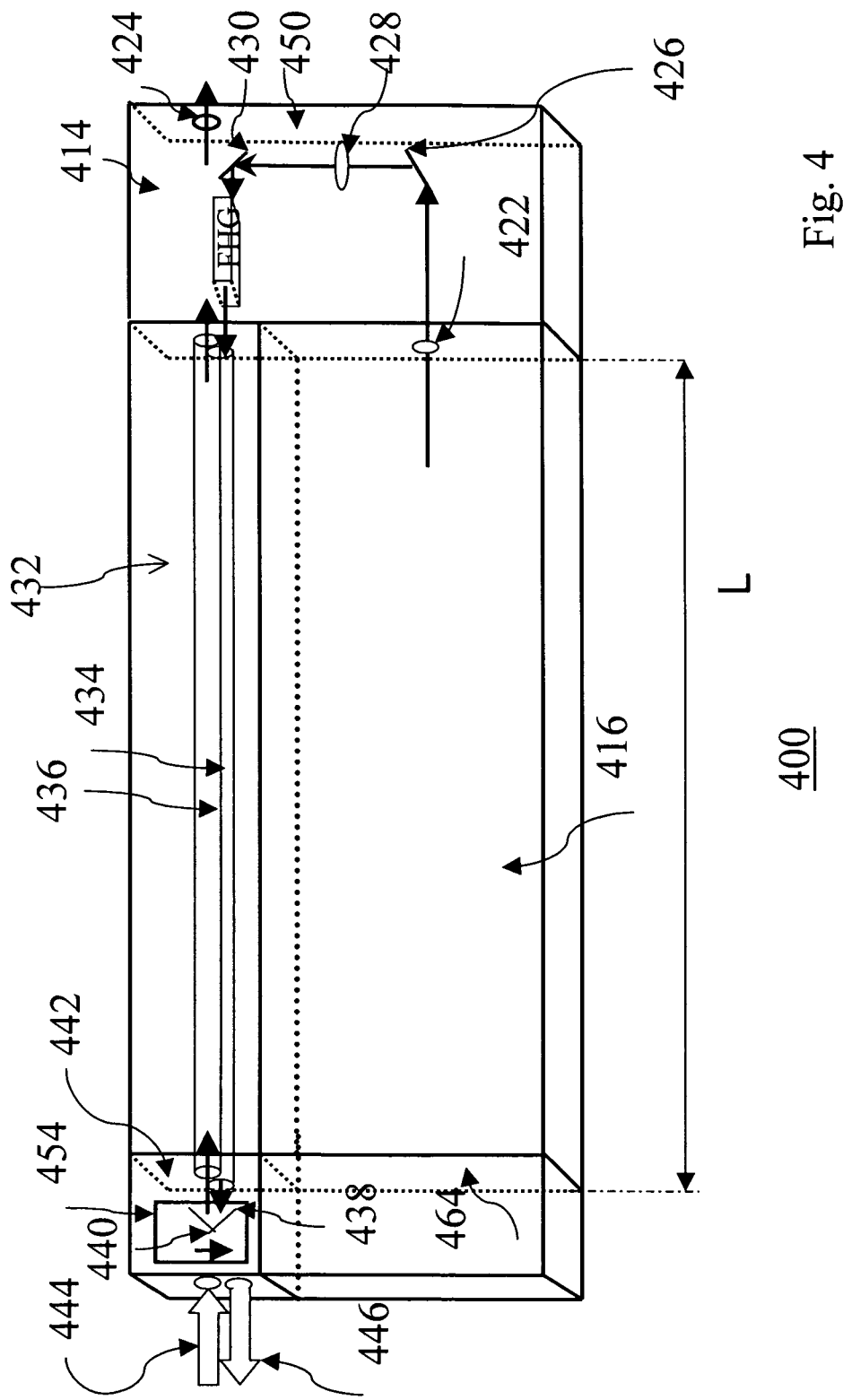
FIG. 4 is a schematic diagram of a laser looking from the top according to the invention

As best seen in FIG. 4, a fourth harmonic laser 400 is provided. The laser includes a second harmonic compartment 416 for generating a second harmonic beam by intracavity frequency doubling of a infrared beam. The second compartment 416 has an exit port, desirably a transparent window 422 transparent to the second harmonic beam, to allow propagation of output beam from the compartment 416.

An ultraviolet (UV) compartment sealed from the second harmonic compartment 416 is provided in optical communication with the exit port 422 and receives the second harmonic beam. The UV compartment is preferably composed of three separate sections. These sections are a UV generation section 414, a UV propagation section 432, and a prism compartment 442. The UV propagation section 432 is located adjacent to and extends along the length of the compartment 416 preferably along its entire length L. A UV beam outlet, desirably a Brewster window 424, is provided at the end 450 of the UV generation compartment 414.

The UV generation section 414 includes a UV generator desirably a fourth harmonic generator FHG. Desirably, the fourth harmonic generating crystal FHG is a CLBO, or a BBO nonlinear crystal for fourth harmonic generation.

A mirror 426 which is highly reflective for second harmonic beam is provided in optical communication with beam propagating through the exit port 422 to reflect the beam through focusing lens 428. The focused beam is then directed to mirror 430 that is highly reflective for second harmonic beam. The beam is then reflected into a fourth harmonic generator FHG where a portion a second harmonic beam is converted to fourth harmonic beam.

UV and second harmonic beams propagate from the UV crystal FHG on a UV beam path through bore 434 which is adjacent to one side of the compartment 416 and preferably extends substantially its entire length L. The UV and second harmonic beams have a beam waist at or prior to the UV generating crystal FHG, such that the UV and second harmonic beams expand during propagation along the UV beam path through bore 434. The bores 434 and 436 have a diameter which is larger than the desired UV beam diameter propagating from Brewster window outlet 124, preferably 6 to 8 time larger desirably at least 2 to 6 times the desired UV beam diameter.

The UV propagation section 432 is desirably a solid metal rectangular block, preferably aluminum. The compartment 432 desirably includes two horizontally spaced tubular bores 434 and 436 for receipt of UV beam. Optionally a hollow compartment can be used or a hollow compartment with two metal, preferably aluminum tubes extending the length of the compartment.

The prism compartment 442 is located adjacent to the end of the compartment 416 remote from the compartment exit port 422. The prism compartment 442 includes a mirror or prism set, preferably a pair of Pellin Broca prisms 438 and 440 in optical communication with bores 434 and 436 of the UV propagation section 432. Prism compartment 440 desirably has purging inlet 444 and purging outlet 446 so that the entire UV compartment can be purged. A translation stage 454 is provided for mounting the set of prisms or optional dichroic mirrors to change the position of the incident beams on the prisms or mirrors in case damage occurs on the prisms or to the mirror coating to increase the lifetime of the wavelength separator.

The beams propagating from the UV crystal expand along the UV crystal beam path that is the length of UV propagation section 432. According to the invention, beam propagating from said UV beam outlet 424 has a beam diameter greater than 1.0 mm preferably 1.0 mm to 2.0 mm. The preselected length, L, of said main compartment is sufficient that said UV beam has a diameter to UV beam outlet 424 of 1.0 mm or greater. The length L of the main compartment is chosen to allow sufficient beam expansion of the UV beam to the desired beam diameter on its two passes along the length of the main compartment in the bore 434 and 436 of the propagation section. L is at least 25 cm in length, preferably at least 30 cm desirably 25 to 100 cm in length.

The UV beam path extends through the UV propagation section along the outside of the main compartment and desirably along it length, L. A UV beam outlet 424 in optical communication with the UV beam propagating from the UV propagation section bore 436 is located at the end of the UV generation compartment 414 and preferably aligns with bore 436. The resulting UV beam propagating from the UV beam outlet is substantially free of frequencies other than desired UV wavelength, here the fourth harmonic. The UV compartment is sealed from the main compartment. Desirably the UV compartment is purged with nitrogen or clean dry air through purge inlet 444 and purge outlet 446 to remove outgases that develop from contact of components with UV.

The foregoing is considered as illustrative only to the principals of the invention. Further, since numerous changes and modifications will occur to those skilled in the art, it is not desired to limit the invention to the exact construction and operation shown and described above, and accordingly, all suitable modifications and equivalents may be resorted to, falling within the scope of the invention.

The invention claimed is:

1. A UV laser comprising:
    a) a laser resonator for generating an infrared beam, said infrared beam propagating in a preselected infrared beam direction; or for generating second harmonic beam from intracavity second harmonic generation;
    b) a main compartment for said laser resonator, said main compartment having a preselected length;

c) said main compartment having an exit port at one end to allow propagation of output beam from said main compartment;
d) a UV compartment sealed from said main compartment in optical communication with said exit port to receive beam propagating from said resonator;
e) a second harmonic generator located within said main compartment or within said UV compartment in optical communication with said infrared beam to generate a second harmonic beam; said second harmonic beam and said infrared beam propagating on the same beam path from the said second harmonic generator;
f) said UV compartment located adjacent to and extending along the length of said main compartment; said UV compartment having a first end remote from said exit port and a second end proximate said exit port;
g) a UV generating crystal located in said UV compartment in optical communication with said exit port for converting infrared and second harmonic beams into a third harmonic UV beam of a preselected wavelength or second harmonic beam into a fourth harmonic UV beam of a preselected wavelength;
h) beams propagating from said UV nonlinear crystal on a UV crystal beam path adjacent to one side of the main compartment; said UV crystal beam path having first end proximate to said UV nonlinear crystal and a second end remote from said UV crystal;
i) said beams propagating from said UV generating crystal expanding during propagation along said UV crystal beam path;
j) a wavelength separator located along said UV beam path at said second end of said UV generating crystal to spatially separate said UV beam from non UV beams;
k) said wavelength separator directing the UV beam on a separate path from said non UV beams; said UV beam propagating from said wavelength separator in the opposite direction as said beams emerging from said UV generating crystal; said separate path adjacent to the outside of said main compartment;
l) a UV beam outlet in optical communication with said UV beam propagating from said wavelength separator said UV beam outlet located at said second end of said UV compartment, said UV beam propagating from said UV beam outlet being substantially free of frequencies other than said UV wavelength.

2. The laser according to claim 1 wherein said wavelength separator is a set of prisms that separate UV beam from other wavelength beams.

3. The laser according to claim 1 wherein said UV crystal beam path extends substantially the preselected length of said main compartment.

4. The laser according to claim 3 wherein said beams propagating on UV crystal beam path propagate in a direction opposite to said preselected infrared beam direction.

5. The laser according to claim 1 wherein a beam diameter of said UV beam propagating from said UV beam outlet is 1.0 mm or greater.

6. The laser according to claim 1 wherein a beam diameter of said UV beam propagating from said UV beam outlet is 1.0 mm to 2.0 mm.

7. The laser according to claim 2 wherein said pair of prism is a pair of Pellin Broca prisms.

8. The laser according to claim 1 wherein said UV compartment is gas purged.

9. The laser according to claim 8 wherein said gas is nitrogen.

10. The laser according to claim 8 wherein said main compartment is not purged.

11. The laser according to claim 1 further comprising an amplifier stage located in said main compartment to amplify said IR beam.

12. The laser according to claim 1 wherein the UV generating crystal is a third harmonic generating crystal.

13. The laser according to claim 1 wherein the UV generating crystal is a fourth harmonic generating crystal.

14. The laser according to claim 1 wherein the UV generating crystal is a CLBO or BBO fourth harmonic generating crystal.

15. The laser according to claim 1 wherein the UV generating crystal is a BBO or a LBO third harmonic generating crystal.

16. The laser according to claim 3 wherein said preselected length of said main compartment is sufficient that said UV beam at said UV beam outlet has a diameter of 1.0 mm or greater.

17. A UV laser comprising:
a) a laser resonator cavity for generating an infrared beam, said infrared beam propagating in a preselected infrared beam direction, or for generating second harmonic beam through intracavity harmonic generation;
b) a main compartment for said laser resonator said main compartment having a preselected length of 30 cm to 100 cm;
c) said main compartment having an exit port at one end to allow propagation of output beam from said main compartment;
d) a UV compartment sealed from said main compartment in optical communication with said exit port to receive beam propagating from said resonator cavity;
e) a second harmonic generator located within said main compartment or within said UV compartment in optical communication with said infrared beam to generate a second harmonic beam; said second harmonic beam and said infrared beam propagating on the same beam path from the second harmonic generator;
f) said UV compartment including:
i) a UV generation compartment located adjacent said main compartment exit port, said UV compartment in optical communication with said second harmonic beam propagating from said second harmonic generator;
ii) a UV generating crystal located in said UV generation compartment in optical communication with said exit port and said second harmonic generator for converting infrared and second harmonic beams into third harmonic UV beam of a preselected wavelength or second harmonic beam into a fourth harmonic UV beam of a preselected wavelength;
iii) a UV propagation section located adjacent to and extending along the length of said main compartment; said UV propagation section having a UV inlet passageway and a UV return passageway; said beams propagating from said UV crystal on a UV crystal beam path adjacent to one side of the main compartment;
iv) said beams propagating from said UV crystal expanding during propagation along said UV crystal beam path;
v) a prism set located along said UV beam path to spatially separate said UV beam from other wavelength beams;
vi) said prism set directing the UV beam on a separate path from other wavelength beams;
vii) said UV beam propagating from said prism set through said UV return passageway in the opposite direction as said beams emerging from said UV crystal;

viii) a UV beam outlet in optical communication with said UV return passageway, said UV beam propagating from said UV beam outlet being substantially free of frequencies other than said UV wavelength; said UV beam having a diameter of 1 mm or greater.

18. The laser according to claim 17 wherein said UV compartment is gas purged.

19. The laser according to claim 18 wherein said gas is nitrogen.

20. The laser according to claim 18 wherein said main compartment is not purged.

21. The laser according to claim 1 where the wavelength separator is mounted in a translation stage for movement between multiple positions to increase the lifetime of the wavelength separator.

22. The laser according to claim 1 wherein said length L is at least 25 cm in length.

23. The laser according to claim 1 wherein said length L is at least at least 30 cm.

24. The laser according to claim 1 wherein said length L is 30 cm to 100 cm in length.

25. The laser according to claim 1 wherein said beam separator is a pair of dichroic mirrors.

\* \* \* \* \*